Figure 1:
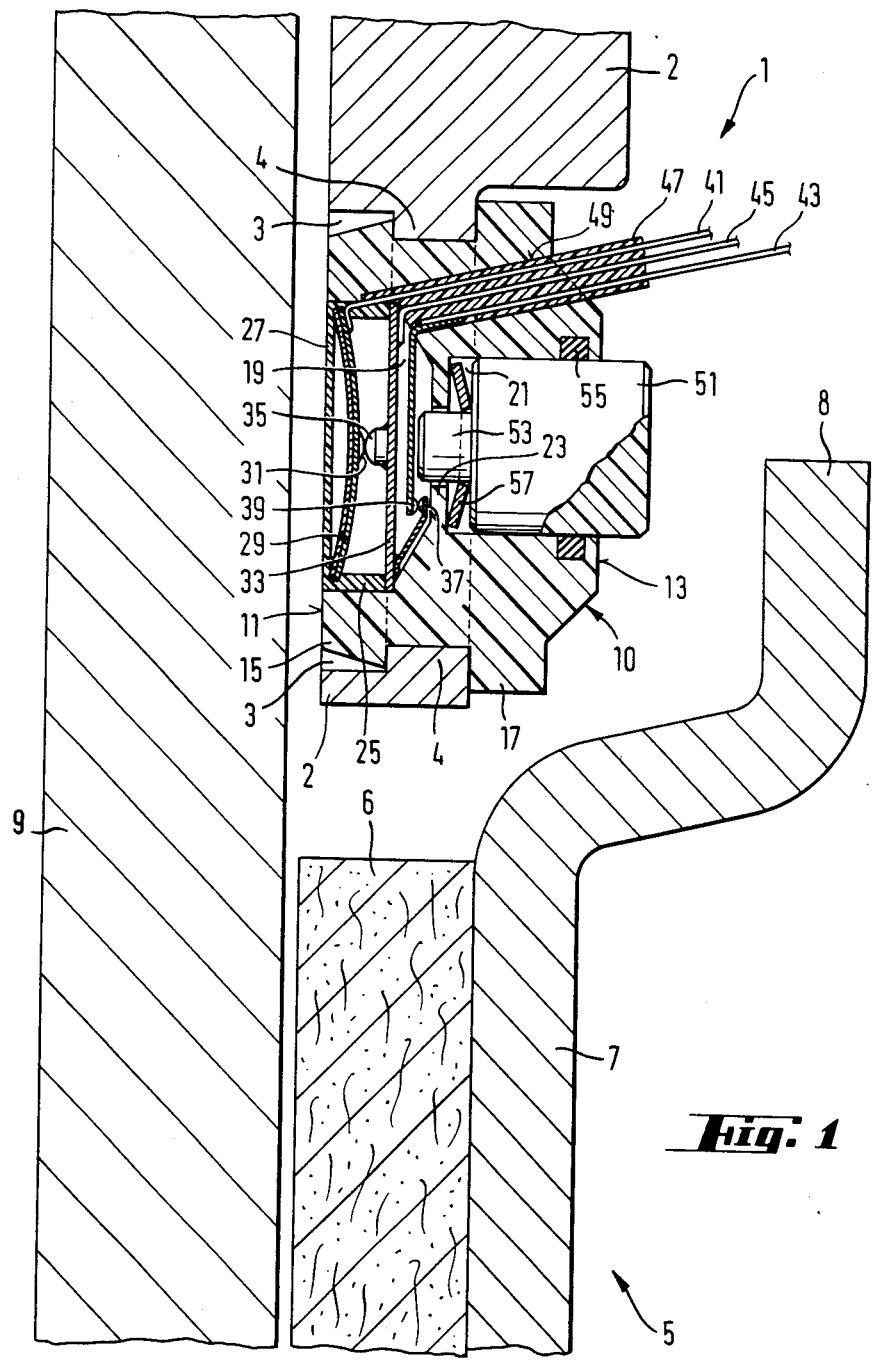

United States Patent [19]

Rath et al.

[11] Patent Number: 4,685,540
[45] Date of Patent: Aug. 11, 1987

[54] SIGNAL TRANSMITTER FOR MONITORING A BRAKE LINING

[75] Inventors: Heinrich B. Rath, Vallendar; Winfried Schemmel, Emmelshausen, both of Fed. Rep. of Germany

[73] Assignee: Lucas Industries public limited company, Birmingham, England

[21] Appl. No.: 826,488

[22] PCT Filed: May 24, 1985

[86] PCT No.: PCT/EP85/00253
§ 371 Date: Jan. 28, 1986
§ 102(e) Date: Jan. 28, 1986

[87] PCT Pub. No.: WO85/05662
PCT Pub. Date: Dec. 19, 1985

[30] Foreign Application Priority Data

Jun. 5, 1984 [DE] Fed. Rep. of Germany ... 8417127[U]
Feb. 12, 1985 [DE] Fed. Rep. of Germany ... 8503812[U]

[51] Int. Cl.⁴ ............................................. F16D 66/00
[52] U.S. Cl. ................... 188/1.11; 340/52 B
[58] Field of Search .................. 188/1.11; 340/52 A, 340/52 B; 116/208

[56] References Cited

U.S. PATENT DOCUMENTS

| 3,674,114 | 7/1972 | Howard | 188/1.11 |
| 3,716,113 | 2/1973 | Kobayashi et al. | 188/1.11 |
| 3,975,706 | 8/1976 | Kato | 188/1.11 X |
| 4,374,375 | 2/1983 | Allori et al. | 188/1.11 X |

FOREIGN PATENT DOCUMENTS 2010817 9/1971 Fed. Rep. of Germany .
1276193 6/1972 United Kingdom .

Primary Examiner—Duane A. Reger
Attorney, Agent, or Firm—Scrivener and Clarke

[57] ABSTRACT

The signal transmitter (1) includes a casing (10) which, when installed, is positioned opposite a brake member (8) at decreasing spacing as the wear of the brake lining (6) progresses. The casing (10) contains electrical contacts (31,35,37,39) and leads (41,43,45) the switching states of which are adapted to be changed at a certain wear or heating of the brake lining (6). A plug (51) is guided in the casing (10) for displacement out of an inoperative position in parallel with the direction of wear of the brake lining (6). Upon progressed wear of the brake lining (6) the brake member (8) mentioned presses the plug (51) further into the casing (10). In a terminal position of the plug (51) at least one of the contacts (37,39) is held in a switching position which differs from the inoperative position, whereby an alarm signal is released.

8 Claims, 2 Drawing Figures

SIGNAL TRANSMITTER FOR MONITORING A BRAKE LINING

The invention relates to a signal transmitter for monitoring a brake lining, especially in a disc brake for motor vehicles, comprising a casing which, when installed, is positioned opposite a brake member at decreasing spacing as the wear of the brake lining progresses and which contains electrical contacts and leads the switching states of which are adapted to be changed at certain wear and/or heating of the brake lining.

A known signal transmitter of this kind (DE-OS No. 2 144 466) is installed in a brake shoe provided for this purpose in a brake lining with a recess of greater diameter which is open toward the corresponding brake disc and with a coaxially adjacent recess of smaller diameter. The recess of smaller diameter extends also through a backplate carrying the brake lining. The casing of the signal transmitter is substantially cylindrical, passes through both recesses, and includes a flange which faces the brake disc and is located in the recess of greater diameter. The two ends of the casing each comprise a closure of an insulating ceramic composition. A wire loop is embedded in the front closure facing the brake disc and lies approximately in the plane of the flange. A pair of wires extend from the loop and through the rear closure to the outside where they form contacts for plug connectors. A bimetal spring is secured to the inside wall of the casing within the front closure and has a free end with a contact in the space between the two closures. A contact at one of the two wires is associated with this contact such that these two contacts are positioned opposite each other at a spacing at normal temperature. When the temperature rises, the bimetal spring deflects until the contacts finally touch each other, closing a circuit, whereby overheating of the brake lining is indicated. When the brake lining is worn considerably but not yet completely, the brake disc slowly wears off a front layer of the front closure until it reaches the wire loop so that a circuit is closed by the brake disc and thereby a signal is emitted during braking indicating the advanced wear of the lining. When the brake disc has entirely destroyed the wire loop upon continued wear of the lining, a closed circuit is interrupted, and this may be utilized to emit a permanent signal.

This known signal transmitter is relatively expensive and yet usually unsuitable for renewed use upon exchange of the brake lining because it is largely destroyed in the course of normal wear of the brake lining.

It is, therefore, the object of the invention to develop a signal transmitter of the kind specified initially such that it can be produced at low cost and be reusable.

This object is met, in accordance with the invention, in that a plug is guided in the casing for displacement from an inoperative position in parallel with the direction of wear of the brake lining and adapted to be pressed further into the casing by the brake member mentioned and, in a terminal position, holds at least one of the contacts in a switching position which differs from the inoperative position.

If the signal transmitter according to the invention is subjected to wear at all, this occurs at the plug which is exchangeable as such so that the signal transmitter can be continued to be used upon replacement of the corresponding brake lining.

If the signal transmitter according to the invention like the known signal transmitter specified initially, is equipped with a heat sensitive switch, such as a bimetal switch, it is convenient to place the heat sensitive switch in a front portion of the signal transmitter facing the brake disc.

In a first embodiment the signal transmitter is arranged like the known signal transmitter described such that an end face of its casing is disposed opposite a rotating brake body, especiallly a brake disc. In this case the invention preferably is developed further in that the casing is fixed to a stationary brake carrier, has its opposed end face disposed opposite an extension of a backplate carrying the lining, and the plug is adapted to be pressed into the casing by this extension.

In a second embodiment the casing of the signal transmitter according to the invention is fixed to a backplate carrying the brake lining, as is the case with the known signal transmitter described initially. In this event preferably a stationary stop is associated with the plug by means of which the plug can be pushed into the casing. In accordance with an alternative the plug is adapted to be pressed into the casing by the direct action of the brake body.

It is convenient to have all contacts which are connected to leads supported on a common contact carrier and introduced into the casing together with the same. This has the advantage that neither a lead nor a contact from which a lead starts are arranged at the plug. The plug thus may be produced at particularly low cost and is easy to mount and replace, if needed.

The latter embodiment permits a further development of the invention according to which the casing comprises two coaxial recesses into which the plug and the contact carrier are inserted from opposed end faces.

In this context it is further convenient to separate the two recesses by a partition which supports a return spring for the plug and through which extends a tappet formed at the plug.

Figure 2:
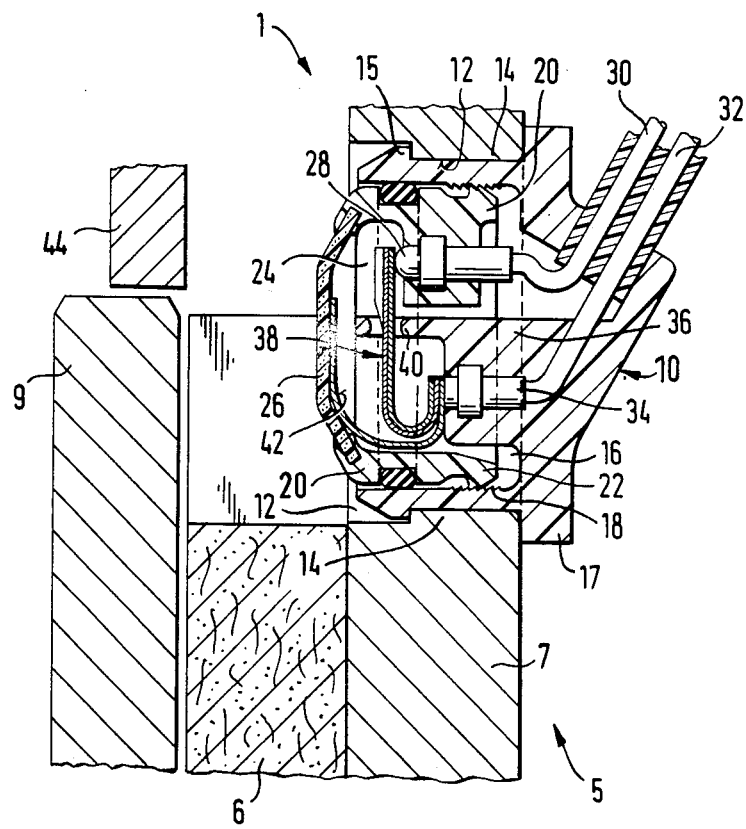

The invention will be described further, by way of example, with reference to the accompanying drawings, in which FIGS. 1 and 2 are axial sectional elevations of a signal transmitter each according to the invention and of the surrounding parts of a motor vehicle disc brake each.

As shown in FIG. 1, a signal transmitter 1 is fixed to a stationary brake carrier 2 including a circular recess 3 with an annular rib 4 to take up the signal transmitter. The signal transmitter 1 is disposed near the edge of a brake pad 5 comprising, as usual, a brake lining 6 and a backplate 7. The backplate 7 is formed with a cranked extension 8 the position of which with respect to a brake disc 9 is monitored by the signal transmitter 1. This permits conclusions to be drawn as to the state of wear of the brake lining 6.

According to FIG. 1 the signal transmitter includes a substantially rotationally symmetric casing 10 of elastic yet heat resistant plastic material having a front end face 11 which is located opposite the brake disc 9 at a small, unchanging distance and a rear end face 13 which is disposed opposite the extension 8 at decreasing spacing as the wear of the brake lining 6 progresses.

The casing 10 has been press fitted into the recess 3 from the rear, i.e. from right to left as seen in FIG. 1, and an annular portion 15 of hook-shaped profile formed near the front end face 11 of the casing has been snapped behind the annular rib 4 of the brake carrier 2.

A flange 17 is formed near the rear end face 13 of the casing 10 to abut against the backside of the rib 4.

The casing 10 is formed from the front with a substantially cylindrical recess 19 of great diameter and coaxially from the rear with a cylindrical recess 21 of smaller diameter. A partition 23 leaves but a narrow central connection between these two recesses.

A pot-shaped contact carrier 25 of insulating material is press fitted into the front recess 19 and is closed toward the front by a cover 27 which likewise is electrically insulating. A diaphragm-like bimetal plate 29 is arranged inside the contact carrier 25 and carries a bistable contact 31 in its middle. An intermediate plate 33 carrying in its middle a first stationary contact 35 is secured in the contact carrier 25 behind the bimetal plate 29. At normal temperature the two contacts 31 and 35 abut each other. However, when the temperature of the bimetal plate 29 which is being heated by the brake disc 9 during braking, exceeds a certain value, the bistable contact 31 snaps forward and thus is removed from the stationary contact 35.

The contact carrier 25 supports a second stationary contact 37 behind the intermediate plate 33 and this contact normally engages a contact 39 which is resiliently supported at the casing 10. The bistable contact 31 is connected to a lead 41, and the resilient contact 39 is connected to a lead 43. The two stationary contacts 35 and 37, on the other hand, are connected to a lead 45. The three leads 41, 43, 45 are enclosed by a common insulating envelope 47 and passed to the outside together with the same through an oblique passage 49 in the casing 10. In the preferred embodiment, illustrated in FIG. 1, this passage 49 presents the only deviation of the casing 10 from perfect rotational symmetry.

As shown in FIG. 1, a plug 51 of insulating plastics is received partly in the rear recess 21. The plug 51 has a central extension 53 which extends through the partition 23 into the front recess 19 where, however, it has no effect as long as the brake lining 6 is new or only incompletely worn. The plug 51 is enclosed by a ring seal 55 embedded in the casing 10 and presenting noticeable resistance to any axial displacement of the plug. A return spring 57 is arranged all around the extension 53 attempting to press the plug 51 away from the partition 23.

When the wear of the brake lining 6 has reached such a point that the extension 8 presses the plug 53 much farther into the casing 10 than illustrated in FIG. 1, the extension 53 hits the resilient support of the movable contact 39 lifting the latter from the second stationary contact 37, whereby a signal circuit is opened. The return spring 57 is unable to displace the plug 51 together with the brake pad 5 whose extension 8 rests against the plug. For this reason the plug 51 stays in its position when the brake lining 6 wear has advanced accordingly, thus keeping the contacts 37 and 39 separated and the respective circuit open. It is only upon disassembly of the brake pad 5 for replacement by a new one that the return spring 57 urges the plug 51 into its starting position which is shown in the drawing.

If the brake disc 9 becomes heated very much during an extended period of braking, it irradiates so much heat that the bimetal plate 29 is warmed up to a predetermined temperature at which it snaps over forwardly, whereby the bistable contact 31 is separated from the first stationary contact 35. This breaks a closed circuit in which these contacts 31 and 35 are arranged as well as the leads 41 and 45.

The embodiment shown in FIG. 2 differs from the one according to FIG. 1 above all in that the signal transmitter 1 is not fixed to the brake carrier but instead to the brake pad 5. The backplate 7 of the brake pad 5 is formed with a recess 12 having an annular rib 14 behind which an annular portion 15 of the casing 10 of hook shape as in FIG. 1 is engaged by snap fitting.

In accordance with FIG. 2 the casing 10 includes a substantially cylindrical recess 16 which is open to the front toward the brake disc 9. Ribs 18 of sawtooth-shaped profile are formed all around the recess 16 in the casing 10. In the recess a plug 20 is received which has an annular rib 22 of hook-shaped profile at its end remote from the brake disc 9. The annular rib 22 is locked behind one of the ribs 18 and this secures the plug 20 against falling out.

The plug 20 includes a cavity 24 which is closed toward the front by a plate 26 of a plastic material which is a good heat conductor. A contact pin 28 protrudes into the cavity 24. It is fixed to the plug 20 and connected to an insulated lead 30. Together with a second insulated lead 32 this lead 30 is passed through the casing 10 to the outside. Both leads 30 and 32 are adapted to be connected to a closed circuit containing a relay or the like (not shown).

The lead 32 ends in a carrier pin 34 embedded in a base member 36 of the casing 10 and carrying a bimetal spring 38. At temperatures from normal to moderately elevated the free end of the bimetal spring 38 engages the contact pin 28 so that the closed circuit remains closed. However, if the brake disc 9 irradiates so much heat that the bimetal spring 38 is warmed up above a predetermined temperature, the bimetal spring will open the closed circuit. As a consequence the relay or the like mentioned will drop, thereby actuating an optical and/or acoustic alarm device.

The bimetal spring 38 extends through an eye 40 formed at the base member 36 and defining the limits of movement of the spring. Together with the bimetal spring 38 a copper plate 42 is fixed to the base member 36 and establishes a large area contact with the plate 26 so as to enhance the heat transfer from the same to the bimetal spring.

As the wear of the brake lining 6 progresses, the backplate 7—and together with it the signal transmitter 1 shown in FIG. 2 approach the brake disc 9. A stationary stop 44 is disposed radially beside the brake disc 9 to be abutted by the plug 20 and its plate 26 before the latter reaches the brake disc. If the brake is actuated as the brake lining 6 continues to wear off, the plug 20 is held back by the stop 44 and thus pressed farther into the casing 10. The bimetal spring 38 in turn is continued to be taken along by the eye 40 in the direction of actuation of the brake pad 5, thus being removed from the contact pin 28. Consequently the closed circuit is interrupted when the wear of the lining has reached an advanced degree, even if the brake disc remains cool.

If it should not be possible to mount the stop 44, the plastic plate 26 will hit against the brake disc 9 upon progressed wear of the lining. This does cause some wear of the plate 26 upon repeated or prolonged brake actuation. However, usually this wear will be of minor importance so that the plate 42 will remain intact and the signal transmitter 1 according to FIG. 2 is suitable for continued use together with a new brake pad 5, just like the one shown in FIG. 1.

What is claimed is:

1. A signal transmitter for monitoring a brake lining, especially in a disc brake for motor vehicles, comprising a casing (10) which, when installed, is positioned opposite a brake member (8;9;44) at decreasing spacing as the wear of the breake lining (6) progresses and which contains electrical contacts (31,35,37,39;28,38) and leads (41,43, 45;30,32) the switching states of which are adapted to be changed at certain wear and/or heating of the brake lining (6), a plug (51;20) guided in the casing (10) for displacement from an inoperative position in parallel with the direction of wear of the brake lining (6) and adapted to be pressed further into the casing (10) by the brake member (8;9-44) and, in a terminal position, holds at least one of the contacts (37;28) in a switching position which differs from the inoperative position, and a heat sensitive switch (31,35;28,38,) arranged in a front area of the signal transmitter facing the brake disc (9).

2. The signal transmitter as claimed in claim 1, wherein said brake member (8,44) is non-rotatable.

3. The signal transmitter as claimed in claim 1, in which an end face (11) of its casing (10) is positioned opposite a rotating brake body (9), characterized in that the casing (10) is fixed to a stationary brake carrier (2), has its opposed end face (13) disposed opposite an extension (8) of a brake lining backplate (7), and the plug (51) is adapted to be pressed into the casing (10) by this extension (8).

4. The signal transmitter as claimed in claim 1 the casing (10) of which is fixed to a backplate (7) carrying the brake lining (6), characterized in that a stationary stop (44) is coordinated with the plug (20) by means of which the plug is adapted to be pressed into the casing (10).

5. The signal transmitter as claimed in claim 1, the casing (10) of which is fixed to a backplate (7) carrying the brake lining (6) and has an end face (11) which is disposed opposite a rotating brake body (9), characterized in that the plug (20) is adapted to be pressed into the casing (10) by direct action of the brake body (9).

6. The signal transmitter as claimed in claim 1, characterized in that all contacts (31,35,37,39) connected to leads (41,43,45) are supported on a common contact carrier (25) and inserted into the casing (10) together with the same.

7. The signal transmitter as claimed in claim 6, characterized in that the casing (10) has two coaxial recesses (19,21) into which the contact carrier (25) and the plug (51) are inserted from opposite end faces (11,13).

8. The signal transmitter as claimed in claim 7, characterized in that the two recesses (19,21) are separated by a partition (23) which supports a return spring (57) for the plug (51) and through which extends a tappet (53) formed at the plug (51).

* * * * *